R. HUFF.
MOTOR VEHICLE.
APPLICATION FILED OCT. 12, 1905.
920,142.
Patented May 4, 1909.
2 SHEETS—SHEET 2.
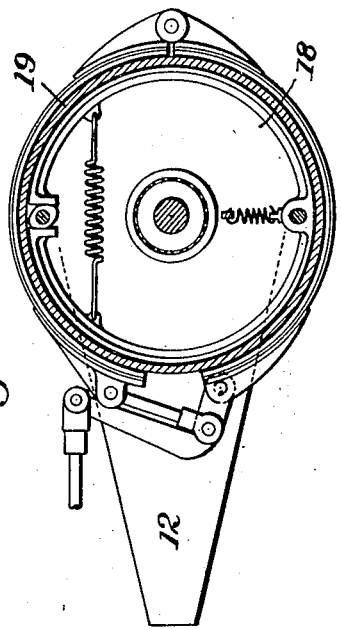
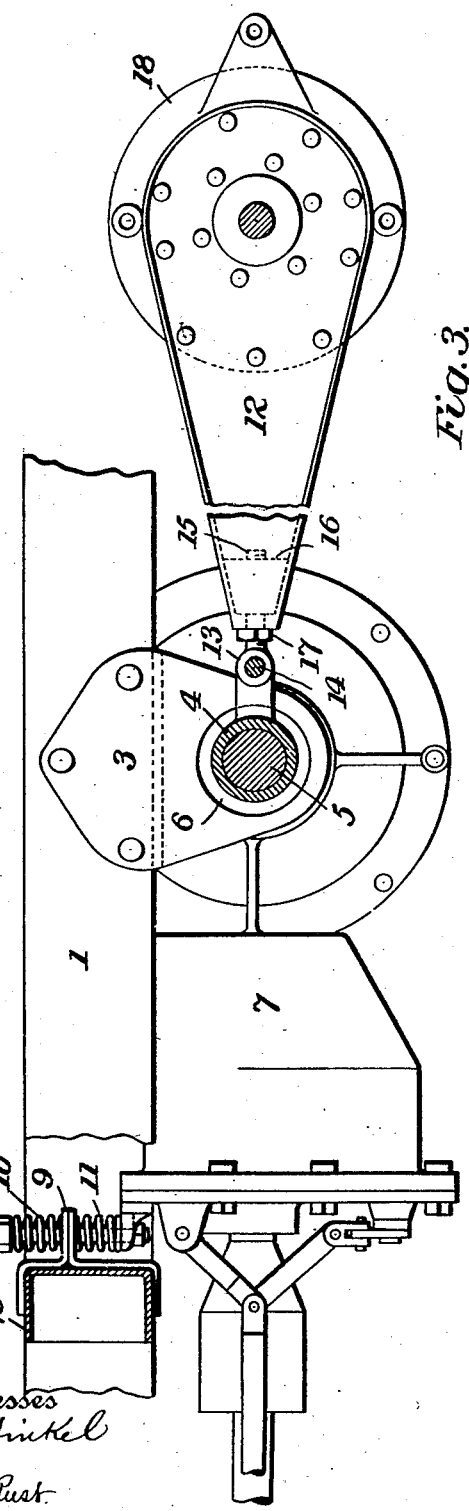
Witnesses
JGStinkel
B.C. Rust
Inventor
Rusell Huff
by Foster Freeman & Watson
Attorneys

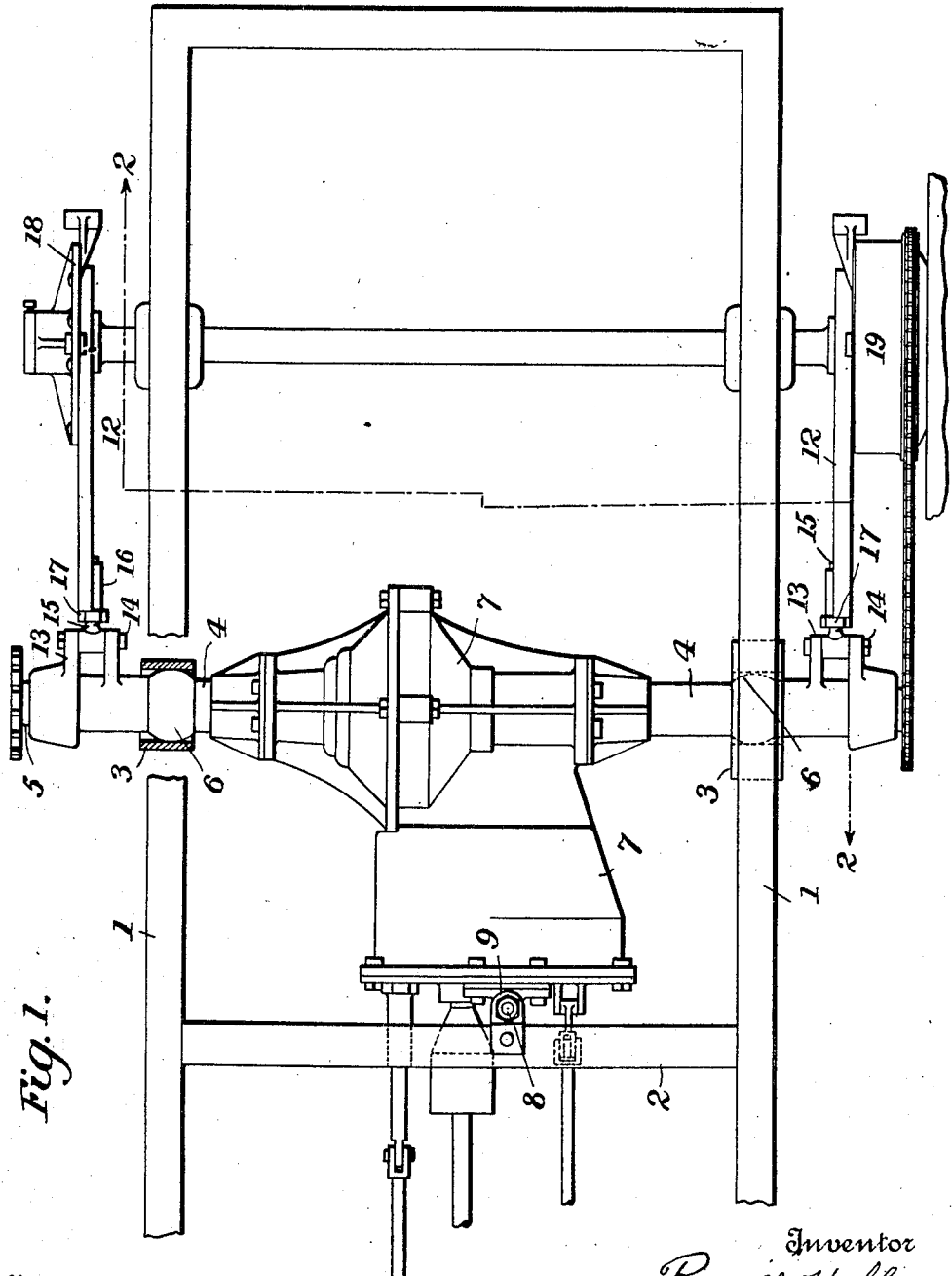

UNITED STATES PATENT OFFICE.

RUSSELL HUFF, OF DETROIT, MICHIGAN, ASSIGNOR TO THE PACKARD MOTOR CAR COMPANY, OF DETROIT, MICHIGAN, A CORPORATION OF WEST VIRGINIA.

MOTOR-VEHICLE.

No. 920,142.     Specification of Letters Patent.     Patented May 4, 1909.

Application filed October 12, 1905. Serial No. 282,482.

*To all whom it may concern:*

Be it known that I, RUSSELL HUFF, a citizen of the United States, residing at Detroit, Wayne county, State of Michigan, have invented certain new and useful Improvements in Motor-Vehicles, of which the following is a specification.

The present invention relates to the running gear of motor vehicles, and more particularly to means for connecting the gear case with the frame and rear axle.

The invention will be described in connection with the accompanying drawing, in which,—

Figure 1 is a plan view of the rear portion of a motor vehicle frame and connected parts embodying the present invention; Fig. 2 is a side elevation of the same partly in section on the line 2—2 of Fig. 1; and Fig. 3 is a detail of one form of brake mechanism which may be used in connection with the present invention.

Referring to the drawing, 1 indicates the side bars of a motor vehicle frame, and 2 a transverse bar thereof, both being preferably constructed of steel channel bars.

The present invention relates to that class of motor vehicles in which there is a transverse shaft, commonly called a jack-shaft, which is driven by the motor and from which power is transmitted to the driving wheel by means of chains or belts.

On the under side of the side bars 1, are bearing brackets 3, in which the casings 4 of the jack-shaft 5 are carried. The casings 4 have swelled or ball-like portions 6, which fit the yokes 3 and permit the frame to warp or twist slightly in going over rough roads without straining or cramping the shaft or its casing. The passages in the yokes 3 which receive the ball-like portions 6 of the jack-shaft casings are of cylindrical form, that is of the same diameter from end to end. By this particular form of bearing the jack-shaft casings are adapted to have a limited movement in the direction of the length of the jack-shaft as well as the universal movement obtained by the use of the spherical bearing portions 6. The shaft casings 4 are rigidly connected with the gear case 7, and the forward end of the gear case is hung upon a bolt 8, which is suitably connected to the gear case, and which passes vertically through a bracket 9 on the transverse frame bar 2. The bolt is provided with suitable heads, and between the heads and the bracket are stout coiled springs 10, 11. This connection permits the gear case to swing laterally and move up and down to a limited extent. In fact it constitutes a flexible universal joint and, together with the ball joints 6, it permits the frame to yield freely to the irregular surface of the road without straining the gear case or cramping the bearings of its contained mechanism. The gear case contains the usual change-speed and reverse gears, which may be controlled in any desired manner.

The rear axle is connected with the jack-shaft casing by adjustable radius rods 12, consisting of substantially triangular metal plates, which are flanged at the upper and lower edges to stiffen them, and which are semi-circular at their rear ends, the flange being carried around the semi-circle. The forward ends of the radius rods 12 are hinged to the jack-shaft casing. As shown the casing has two lugs 13 at each end, and a bolt 14 passes through said lugs and through the head of a threaded rod 15. The rod 15 is screwed into a block 16, which is rigidly connected with the radius rod 12 and it is secured in any desired adjustment by a nut 17.

The rear circular end of the radius rod is arranged concentric with the rear axle and securely connected, by riveting or otherwise, to the disk 18 which carries the brake shoes and their operating devices. The radius rods may be lengthened or shortened to adjust the chains to the sprocket wheels by removing the bolts 14 and turning the threaded rods 15. It will be seen that the radius rods or plates constructed as above, are very strong in proportion to their weight, and that they stiffen and strengthen the disks or foundation plates 18 for the brakes, and securely hold them from turning.

Any suitable brake may be used in connection with the foundation plates 18. In the drawing, I have shown inner and outer brake shoes adapted to operate upon flanges 19 which are securely connected to the vehicle wheels.

Having described my invention, what I claim and desire to secure by Letters Patent is,—

1. In a motor vehicle, the combination with a frame having longitudinal side pieces and a transverse bar, of jack-shaft casings having universal joint connections with the side pieces of the frame, and also adapted to move longitudinally, and a gear case rigidly connected to said jack-shaft casings, said gear case having a yielding universal joint connection with the transverse bar.

2. In a motor vehicle, the combination with a frame having side pieces and a transverse bar, of brackets depending from the side pieces, a jack-shaft having casings provided with spherical portions seated in said brackets, a gear case rigidly connected with said shaft casings, a bracket connected with the transverse frame bar, a bolt or rod having a spring connection with said bracket, said bolt or rod being connected to the forward end of the gear case.

3. In a motor vehicle, the combination with a frame, having cylindrical bearings supported by its side pieces, of jack-shaft casings having spherical portions mounted in said bearings, and a gear case rigidly connected to the jack-shaft casings and having an independent yielding connection with a transverse bar of the frame.

4. In a motor vehicle, the combination with a frame, of a gear case, jack shaft casings projecting laterally from the gear case and each having at an intermediate point in its length an enlarged spherical portion, brackets depending from the side pieces of the frame and having therein cylindrical bearings adapted to receive the spherical portions of the jack-shaft casings, a transverse bar connecting the side pieces of the frame, and a yielding universal joint connection between the gear case and said transverse bar.

5. In a motor vehicle, the combination with a frame having side pieces and a transverse bar, of yoke shaped brackets each having parallel ears at its upper end, between which a side piece of the frame extends, and having a portion depending from the side frame piece and having a cylindrical passage or bearing formed therein, a gear case, jack-shaft casings rigidly connected with the gear case and having spherical portions fitting said cylindrical bearings, and a yielding universal joint connection between the gear case and the transverse bar of the frame.

6. In a motor vehicle, the combination with a jack-shaft and its casing, and with the rear axle and the foundation plates for the brakes mounted thereon, of radius rods pivotally connected with the jack-shaft casings and rigidly connected with said foundation plates for the brakes, said radius rods comprising substantially triangular metal plates, as set forth.

7. In a motor vehicle, the combination with a jack-shaft and its casing, and with the rear axle and the foundation plates for the brakes mounted thereon, of radius rods pivotally connected with the jack-shaft casings and rigidly connected with said foundation plates for the brakes, said radius rods comprising substantially triangular metal plates flanged at their edges and having semi-circular flanged rear ends concentric with the rear axle, as set forth.

8. In a motor vehicle, the combination with the frame having longitudinal side pieces and a transverse bar, of a non-rotating casing for the jack-shaft having universal joint connections with the side pieces of the frame, a gear case rigidly connected to and supported by said jack-shaft casing, and a universal joint connection between said gear case and the said transverse bar.

In testimony whereof I have signed my name to this specification in the presence of two subscribing witnesses.

RUSSELL HUFF.

Witnesses:
MARK C. TAYLOR,
L. RODMAN MACK.